(12) United States Patent
Avery et al.

(10) Patent No.: US 10,380,233 B2
(45) Date of Patent: Aug. 13, 2019

(54) LAUNCHING WORKFLOW PROCESSES BASED ON ANNOTATIONS IN A DOCUMENT

(75) Inventors: Kenytt D. Avery, Newport Beach, CA (US); Matthew D. Vest, Bothell, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 13/558,755

(22) Filed: Jul. 26, 2012

(65) Prior Publication Data
US 2014/0033211 A1  Jan. 30, 2014

(51) Int. Cl.
G06F 17/00 (2006.01)
G06F 17/24 (2006.01)
G06Q 10/06 (2012.01)

(52) U.S. Cl.
CPC ....... *G06F 17/241* (2013.01); *G06Q 10/0633* (2013.01)

(58) Field of Classification Search
CPC ................................ G06F 9/46; G06F 17/241
USPC .......................................... 715/230–233, 200
See application file for complete search history.

(56) References Cited

U.S. PATENT DOCUMENTS

| | | | |
|---|---|---|---|
| 6,721,921 B1 | 4/2004 | Altman | |
| 7,472,341 B2 * | 12/2008 | Albornoz et al. | 715/230 |
| 7,475,335 B2 | 1/2009 | Krishna et al. | |
| 7,478,332 B2 | 1/2009 | Buettner et al. | |
| 7,555,705 B2 | 6/2009 | Chen et al. | |
| 7,765,192 B2 | 7/2010 | Svendsen | |
| 7,818,300 B1 | 10/2010 | Kilday et al. | |
| 7,870,152 B2 | 1/2011 | Cragun et al. | |
| 7,962,847 B2 | 6/2011 | Malkin et al. | |
| 8,015,482 B2 | 9/2011 | Simova et al. | |
| 8,229,897 B2 | 7/2012 | Cannon et al. | |

(Continued)

OTHER PUBLICATIONS

Williamsonline CreateSafe—Annotations "Simplify approval workflows" https://web.archive.org/web/20120623200423/http://williamsonline.com/annotations.php.*

(Continued)

*Primary Examiner* — Manglesh M Patel
(74) *Attorney, Agent, or Firm* — Lee Law, PLLC; Christopher B. Lee (57) ABSTRACT

Methods and apparatus, including computer program products, implementing and using techniques for launching a process based on annotations made to a document in an enterprise content management system. It is determined whether an annotation has been added to a document in the enterprise content management system, wherein the annotation is stored as a separate element and the separate element is associated with the document. It is determined whether the annotation is of a type indicating that a subsequent workflow process is to be performed. In response to determining that the annotation is of a type indicating that a subsequent workflow process is to be performed, the annotation is parsed to obtain information to be used in the subsequent workflow process. The subsequent workflow process is launched. The launch uses at least some of the information obtained from parsing the annotation as parameters in the subsequent workflow process.

10 Claims, 6 Drawing Sheets

(56) References Cited

U.S. PATENT DOCUMENTS

| | | | |
|---|---|---|---|
| 8,850,516 | B1 | 9/2014 | Hrebicek et al. |
| 9,262,390 | B2* | 2/2016 | Edala .................... G06F 17/241 |
| 9,704,115 | B2* | 7/2017 | Johnson ........... G06Q 10/06311 |
| 9,842,095 | B2* | 12/2017 | Kumar .................. G06F 17/241 |
| 2004/0163042 | A1* | 8/2004 | Altman ......................... 715/512 |
| 2005/0210038 | A1 | 9/2005 | Dettinger et al. |
| 2006/0259468 | A1 | 11/2006 | Brooks et al. |
| 2006/0282762 | A1 | 12/2006 | Diamond et al. |
| 2007/0136397 | A1 | 6/2007 | Pragada et al. |
| 2008/0066048 | A1 | 3/2008 | Hafermann et al. |
| 2008/0172293 | A1* | 7/2008 | Raskin et al. .................. 705/14 |
| 2008/0178198 | A1 | 7/2008 | Gauba |
| 2009/0125597 | A1* | 5/2009 | Carr ........................ H04L 51/34 709/206 |
| 2009/0177721 | A1 | 7/2009 | Mimatsu |
| 2009/0235155 | A1 | 9/2009 | Ueda |
| 2009/0249446 | A1 | 10/2009 | Jenkins et al. |
| 2009/0300064 | A1* | 12/2009 | Dettinger ................. G06F 17/21 |
| 2009/0300471 | A1 | 12/2009 | Dettinger et al. |
| 2009/0300705 | A1* | 12/2009 | Dettinger ................ G06F 21/10 726/1 |
| 2010/0057769 | A1 | 3/2010 | Lippert et al. |
| 2010/0115393 | A1 | 5/2010 | Albornoz et al. |
| 2010/0153835 | A1 | 6/2010 | Xiong et al. |
| 2010/0218082 | A1* | 8/2010 | Charfi .................... G06Q 10/04 715/230 |
| 2011/0023007 | A1* | 1/2011 | Chumbley ................ G06F 8/71 717/102 |
| 2011/0078169 | A1* | 3/2011 | Sit ................................. 707/769 |
| 2011/0167331 | A1 | 7/2011 | Altman |
| 2012/0030256 | A1 | 2/2012 | Pfeifer et al. |
| 2012/0060082 | A1 | 3/2012 | Edala et al. |
| 2012/0259746 | A1* | 10/2012 | Groom ................... G06Q 10/00 705/30 |
| 2013/0159938 | A1 | 6/2013 | James et al. |
| 2014/0012614 | A1* | 1/2014 | Beresford-Wood ... G06Q 40/12 705/7.15 |
| 2014/0358868 | A1 | 12/2014 | Costecalde et al. |
| 2016/0048563 | A1 | 2/2016 | Avery et al. |
| 2016/0048574 | A1 | 2/2016 | Avery et al. |
| 2017/0329752 | A1* | 11/2017 | Kumar .................. G06F 17/241 |

OTHER PUBLICATIONS

Hinge et al.; "Process SEER: A Tool for Semantic Effect Annotation of Business Process Models", EDOC IEEE International Conference on, Sep. 1-4, 2009, pp. 54-63.

Liu et al.; "A Framework for Semantic Web Services Annotation and Discovery Based on Ontology", PIC IEEE International Conference on, Dec. 10-12, 2010, pp. 1034-1039.

United States Patent and Trademark Office, Office Action for U.S. Appl. No. 13/909,236, dated Dec. 24, 2015, pp. 1-16, Alexandria, VA, USA.

United States Patent and Trademark Office, Office Action for U.S. Appl. No. 13/909,236, dated Jul. 22, 2015, pp. 1-25, Alexandria, VA, USA.

United States Patent and Trademark Office, Office Action for U.S. Appl. No. 13/909,236, dated May 5, 2016, pp. 1-22, Alexandria, VA, USA.

United States Patent and Trademark Office, Office Action for U.S. Appl. No. 13/963,555, dated Jun. 15, 2016, pp. 1-10, Alexandria, VA, USA.

United States Patent and Trademark Office, Advisory Action for U.S. Appl. No. 13/909,236, dated Jan. 5, 2017, pp. 1-10, Alexandria, VA, USA.

United States Patent and Trademark Office, Advisory Action for U.S. Appl. No. 13/963,555, dated Sep. 15, 2016, pp. 1-7, Alexandria, VA, USA.

United States Patent and Trademark Office, Office Action for U.S. Appl. No. 13/909,236, dated Oct. 21, 2016, pp. 1-33, Alexandria, VA, USA.

United States Patent and Trademark Office, Office Action for U.S. Appl. No. 14/460,238, dated Oct. 13, 2016, pp. 1-34, Alexandria, VA, USA.

United States Patent and Trademark Office, Office Action for U.S. Appl. No. 13/963,555, dated Mar. 11, 2016, pp. 1-30, Alexandria, VA, USA.

United States Patent and Trademark Office, Examiners Answer for U.S. Appl. No. 13/909,236, dated Jun. 2, 2017, pp. 1-30, Alexandria, VA, USA.

United States Patent and Trademark Office, Office Action for U.S. Appl. No. 14/460,238, dated May 31, 2017, pp. 1-22, Alexandria, VA, USA.

United States Patent and Trademark Office, Office Action for U.S. Appl. No. 13/963,555, dated Apr. 6, 2017, pp. 1-22, Alexandria, VA, USA.

United States Patent and Trademark Office, Advisory Action for U.S. Appl. No. 13/963,555, dated Jan. 5, 2018, pp. 1-10, Alexandria, VA, USA.

United States Patent and Trademark Office, Office Action for U.S. Appl. No. 14/723,751, dated Sep. 14, 2017, pp. 1-47, Alexandria, VA, USA.

United States Patent and Trademark Office, Office Action for U.S. Appl. No. 13/963,555, dated Oct. 18, 2017, pp. 1-25, Alexandria, VA, USA.

United States Patent and Trademark Office, Office Action for U.S. Appl. No. 13/963,555, dated Apr. 9, 2018, pp. 1-11, Alexandria, VA, USA.

United States Patent and Trademark Office, Office Action for U.S. Appl. No. 14/460,238, dated Apr. 4, 2018, pp. 1-34, Alexandria, VA, USA.

United States Patent and Trademark Office, Office Action for U.S. Appl. No. 14/723,751, dated May 18, 2018, pp. 1-35, Alexandria, VA, USA.

United States Patent and Trademark Office, Advisory Action for U.S. Appl. No. 14/723,751, dated Oct. 29, 2018, pp. 1-6, Alexandria, VA, USA.

United States Patent and Trademark Office, Notice of Allowance for U.S. Appl. No. 13/963,555, dated Nov. 6, 2018, pp. 1-13, Alexandria, VA, USA.

Nabeel U. Khan, et al., Administrative Patent Judges, United States Patent and Trademark Office, PTAB Decision on Appeal for U.S. Appl. No. 13/909,236, dated Jul. 24, 2018, pp. 1-21, Alexandria, VA, USA.

United States Patent and Trademark Office, Office Action for U.S. Appl. No. 13/909,236, dated Nov. 26, 2018, pp. 1-46, Alexandria, VA, USA.

United States Patent and Trademark Office, Office Action for U.S. Appl. No. 14/460,238, dated Dec. 12, 2018, pp. 1-22, Alexandria, VA, USA.

United States Patent and Trademark Office, Advisory Action for U.S. Appl. No. 14/460,238, dated Mar. 1, 2019, pp. 1-12, Alexandria, VA, USA.

* cited by examiner

LAUNCHING WORKFLOW PROCESSES BASED ON ANNOTATIONS IN A DOCUMENT

BACKGROUND

The present invention relates to Enterprise Content Management (ECM) Systems, and more specifically, to techniques for initiating various types of processes in ECM systems. ECM generally refers to the collection strategies, methods and tools used to capture, manage, store, preserve, and deliver content and documents related to organizational processes. ECM tools and strategies allow the management of an organization's unstructured information, wherever that information exists.

ECM systems typically include an image viewer application that provides the capability for a user to annotate an image document. The annotations can be used, for example, to call attention to specific areas of the graphic, to apply a stamp of approval, or to add text notes. Most conventional ECM systems also allow users to launch various types of workflows. Certain ECM systems, such as the IBM FileNet P8® Platform, which is available from International Business Machines Corporation of Armonk, N.Y., include capabilities for associating a subscription with content events, which events can subsequently launch an associated workflow.

While most ECM systems have capabilities for carrying out a wide range of distinct operations, these operations typically need to be handled separately. Thus, it is both cumbersome and error-prone to require users to both annotate and remember to manually dispatch or launch a workflow process of a work item. It would be desirable to have a more integrated ECM system compared to conventional ECM systems.

SUMMARY

According to one embodiment of the present invention, launching a process based on annotations made to a document in an enterprise content management system. It is determined whether an annotation has been added to a document in the enterprise content management system, wherein the annotation is stored as a separate element and the separate element is associated with the document. It is determined whether the annotation is of a type indicating that a subsequent workflow process is to be performed. In response to determining that the annotation is of a type indicating that a subsequent workflow process is to be performed, the annotation is parsed to obtain information to be used in the subsequent workflow process. The subsequent workflow process is launched. The launch uses at least some of the information obtained from parsing the annotation as parameters in the subsequent workflow process.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

The various embodiments described herein pertain to techniques in ECM systems for using structured annotations such as text, sticky notes, approval stamps, etc. to serve as triggers for launching workflows or dispatching a work item in the ECM system. For example, applying a stamp of approval to a loan document might automatically initiate a workflow process routing the document for further loan processing or disbursement of funds. If a 'Rejected' annotation is applied to the loan document, then the workflow is automatically routed to inform the applicant that their loan has been denied. Another example in which these techniques can be applied is the health care industry. In this case, the document can be an x-ray image and an evaluator of the x-ray image can apply an "arrow annotation" to identify an area of the x-ray image that shows, for example, a fracture. In response to the evaluator applying the "arrow annotation," a work item can be automatically routed to a physician to begin a treatment plan.

The various embodiments of the invention that are described herein can realize several advantages. For example, the number of distinct operations a user needs to remember and perform is reduced, which also leads to increased efficiency in initiating new processes and a reduction in the number of errors caused by the users. Once a workflow is associated with a content engine update event for a given annotation, the end user can simply annotate the document and be assured that the proper business process will be initiated automatically, rather than having to manually initiate the business process as a separate task, which greatly simplifies the workflow. Whenever a given annotation is applied to an image, it is assured that the proper corresponding workflow process will be launched, i.e. the consistency is improved compared to conventional techniques. From an auditing perspective, this model assures that a given business process is always (automatically) run after a given annotation is applied, thus improving the compliance of workflow processes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary ECM System Architecture

Figure 1:
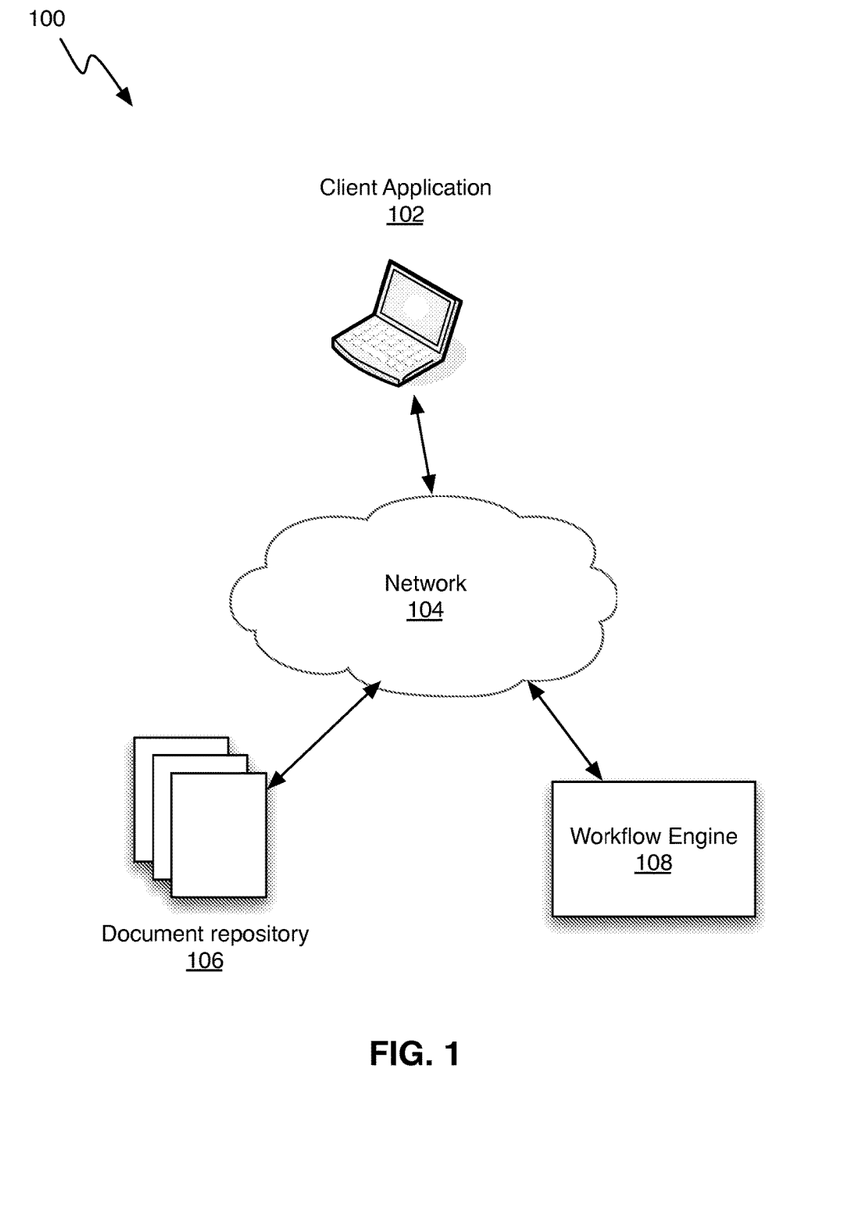
FIG. 1 shows a schematic view of an ECM system, in accordance with one embodiment.

FIG. 1 shows a schematic example of an ECM system (100) in which various embodiments of the invention can be implemented. As can be seen in FIG. 1, the ECM system (100) includes a client application (102) that communicates with a document repository (106) and a workflow engine (108) over a network (104). The network (104) can be any type of conventional network, such as an Intranet or the Internet and the communication between the client application (102), the document repository (106) and the workflow engine (108) can occur through any conventional techniques, which are familiar to those of ordinary skill in the art. The client application (102) is typically some type of stand-alone or web-based image viewer application that provides the capability for a user to annotate an image document stored in the document repository (106). The workflow engine (108) is responsible for coordinating and executing the various steps of the workflow process, in accordance with rules defined by the ECM system administrator or the ECM system users. As will be seen below, various actions can be used to automatically trigger other actions within the ECM system (100), for example, by various types of subscription mechanisms. As was described above, the P8 FileNet® system is one example of an ECM system (100) of this type, in which the various embodiments of the invention can be advantageously implemented.

Exemplary Embodiment Described from a User Experience Perspective

An exemplary embodiment will now be described from a user experience perspective and with reference to the drawings. As was discussed above, in this embodiment, it is assumed that the ECM system is an ECM system similar to the ECM system (100) described above with reference to FIG. 1, that is, an ECM system in which annotations are stored separately from the document (e.g., as a separate content elements), and in which the annotations are stored in a structured format that can be parsed. The content of the annotation can then be used to launch or dispatch an event, as will be described below.

Figure 2:
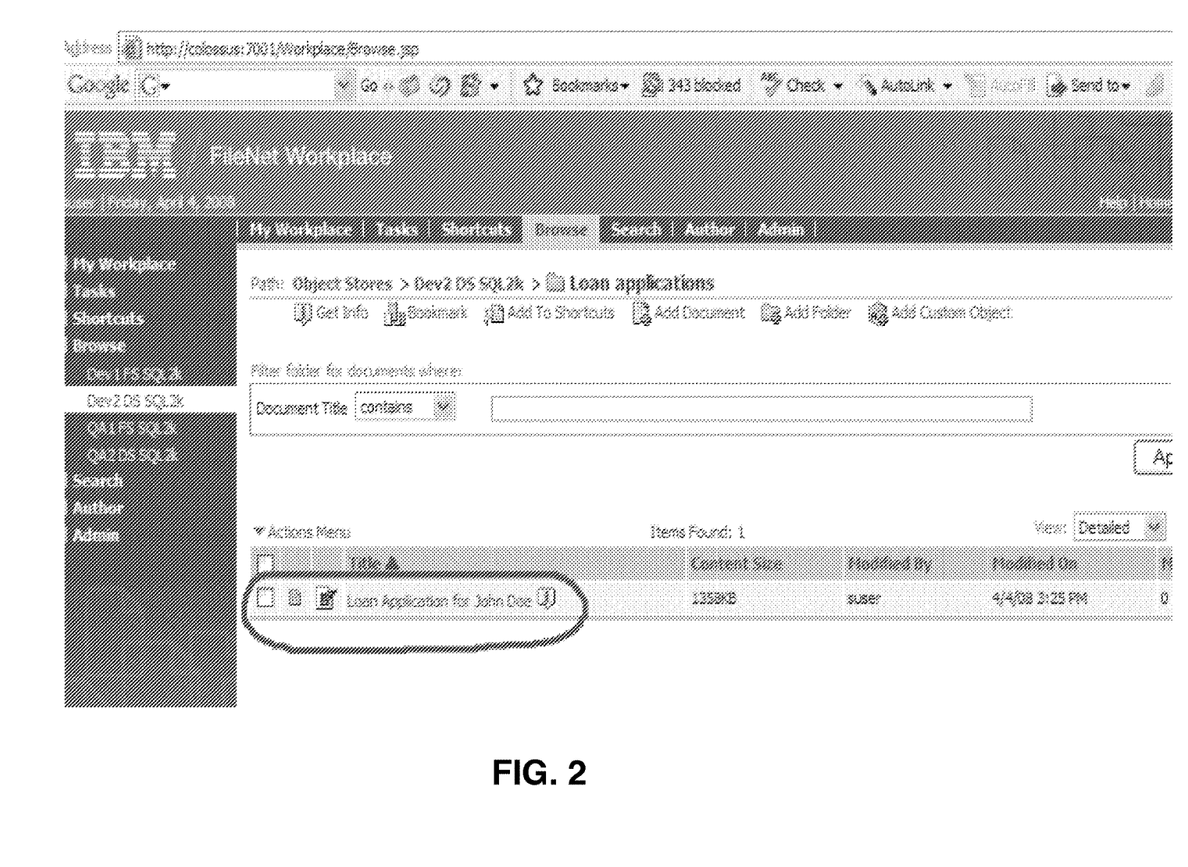
FIG. 2 shows an exemplary screenshot of user interface of an ECM system, in accordance with one embodiment.

In this usage scenario, it is assumed that user Bob is a Loan Officer at a bank who is reviewing a loan application. The loan application has been scanned into the ECM system and available as an image document in a client application or presentation layer in which documents and folders can be browsed, viewed, etc. For simplicity, this will be referred to as a "client application" below. FIG. 2 shows a screenshot of a user interface in which the loan application is shown as a list item. Next, Bob opens the loan application document in an Image Viewer in order to review the application, by clicking on the loan application in the list.

Figure 3:
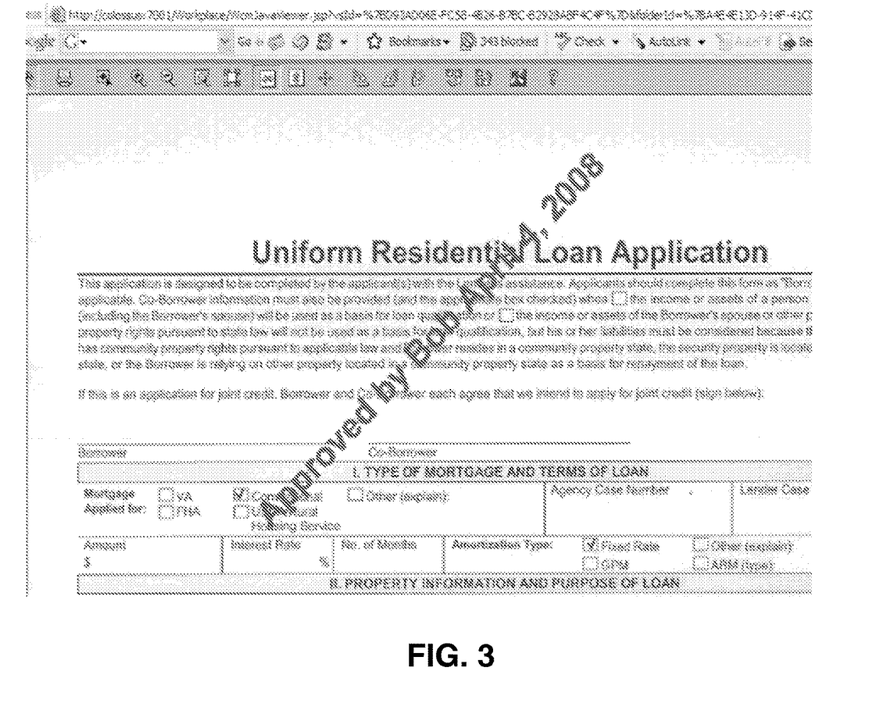
FIG. 3 shows an exemplary screenshot of an annotated document in the ECM system, in accordance with one embodiment.
Figure 4:
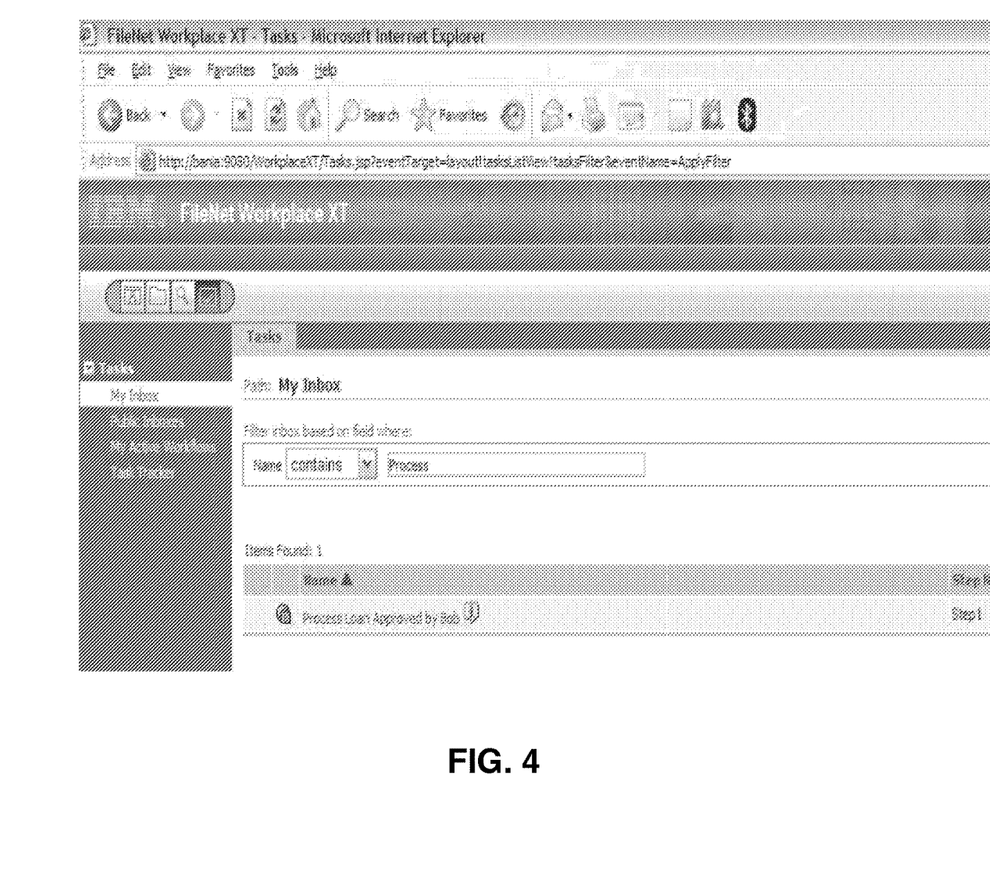
FIG. 4 shows an exemplary screenshot of an inbox of a user of the ECM system, in accordance with one embodiment.

Bob decides to approve the loan application, and annotates the document by adding an annotation saying "Approved by Bob Apr. 4, 2008", as shown in FIG. 3. When the document with the annotation is saved, the presence of an "Approved" annotation launches a Business Process Management (BPM) workflow. The BPM workflow results in a new work item appearing in a different user's inbox, as shown in FIG. 4.

Exemplary Embodiment Described from a Technical Perspective

Figure 5:
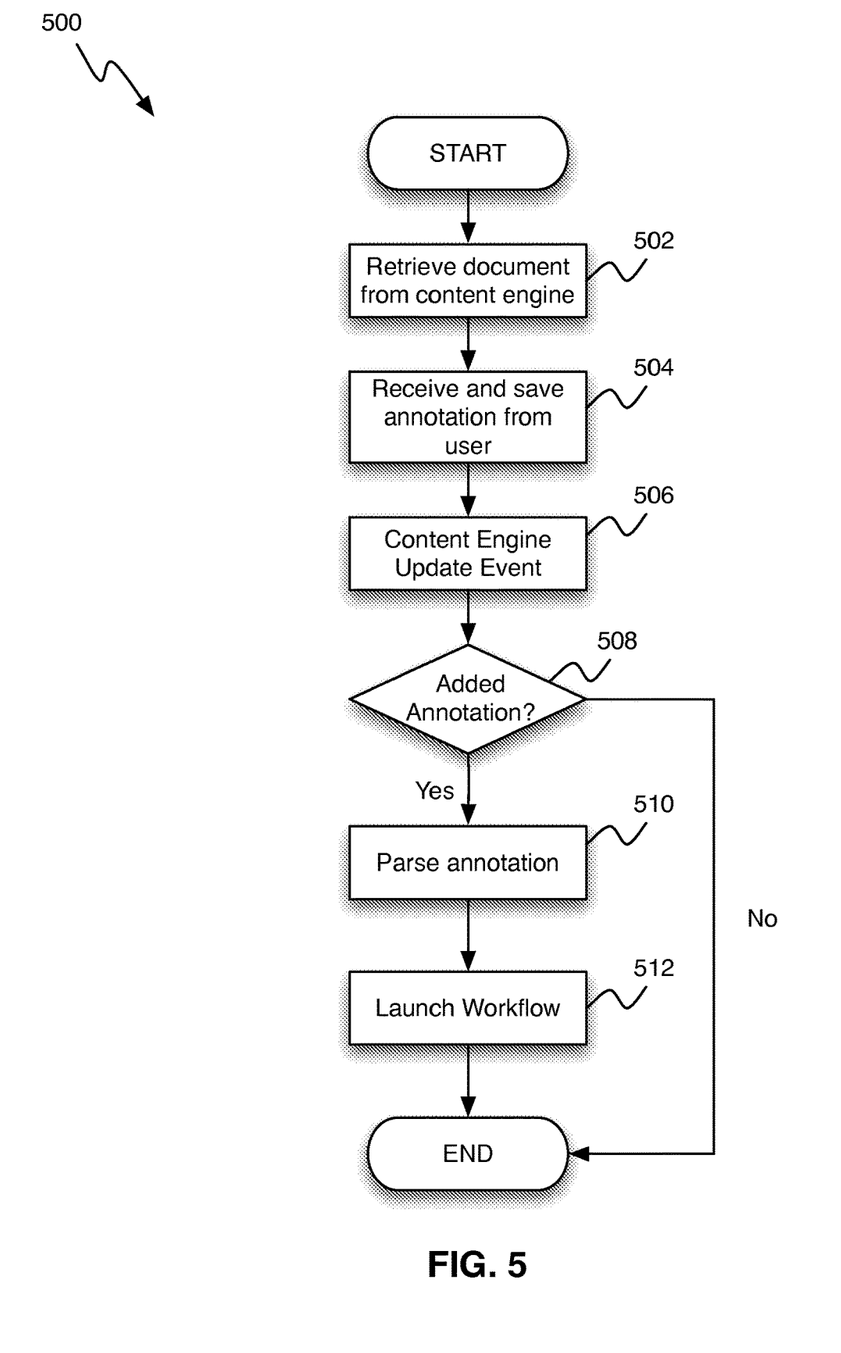
FIG. 5 shows a flowchart of a process (500) for launching a workflow process in an ECM system, in accordance with one embodiment.

FIG. 5 shows a flowchart of a process (500) for launching a workflow process in an ECM system, in accordance with one embodiment. The document (in this case, the image of the loan application) is stored in the Content Engine. When the user opens the loan application, the document is retrieved from the content engine and is displayed to the user (step 502). An annotation is then received from the user, and the annotated document is saved (step 504). In this embodiment the annotation is stored as an additional content element in the document. It should however be noted that in a generic content management system, the annotation object can also be stored as its own independent object, with a link to the document object.

In response to saving the document, a content engine update event is fired (step 506). A subscription to content engine update events triggers a custom event action, which in this case examines whether an annotation has been added to the document (step 508). If it is determined that the correct kind of annotation has been added (e.g. "approved"), the annotation is parsed (step 510). The expression "correct kind of annotation", as used herein, refers to an annotation (among a large set of possible annotations) that is linked to a workflow. For example, adding a different annotation, such as a line, would not cause a workflow process to be launched, while an "approved" annotation would launch a workflow process. Parsing the annotation, as used herein, refers to programmatically determining what annotation type was used, and possibly extracting any data from the annotation types that have customizable fields in the annotation, such as, for example, pulling the user name and date out of an annotation that says "Approved by Bob on March 3$^{rd}$", for example.

Figure 6:
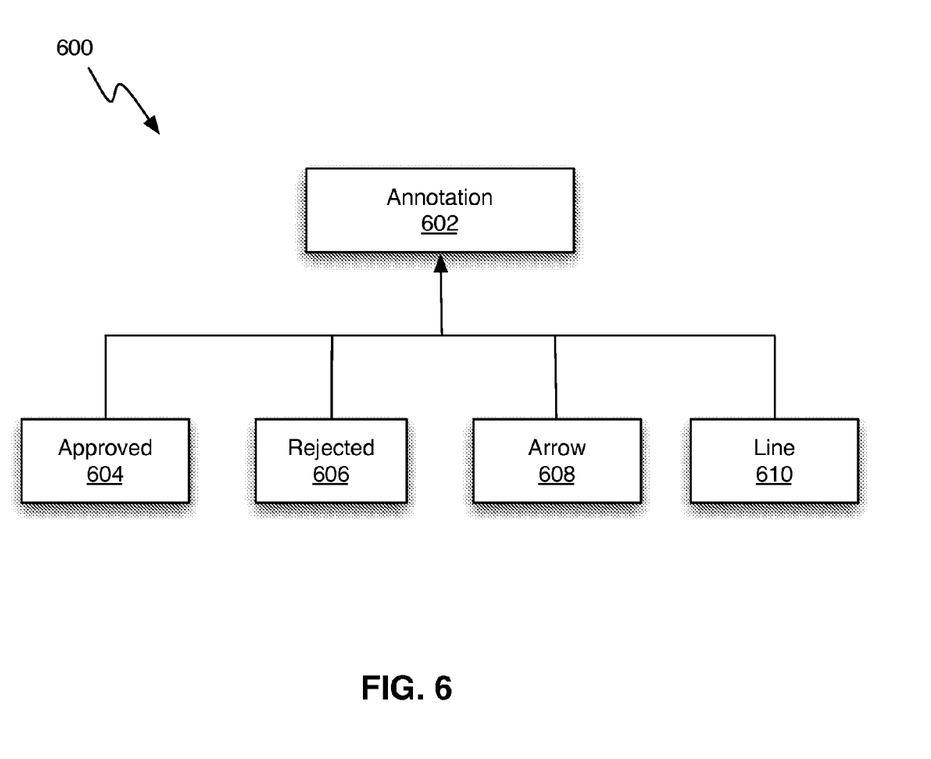
FIG. 6 shows a class diagram (600) of how content management system metadata can be organized in accordance with one embodiment.

As the skilled person realizes, there are several ways in which it can be determined what type of annotation has been added to a document. In one implementation, the annotation sub-types can be listed as classes underneath the Annotation class, as illustrated in the UML diagram (600) of FIG. 6, and the program can discover the annotation type based upon the class instance. For example, as can be seen in FIG. 6, the content management system metadata can be organized as an Annotation parent class (602) having the following subclasses: Approved annotation (604), Rejected annotation (606), Arrow annotation (608), and Line annotation (610).

In another implementation, the content of the annotation itself can be parsed. For example, rather than relying upon the class structure above, the program can simply examine the content to determine whether it says, "Approved", by whom, on what date, etc.

Finally, a workflow process is launched for the annotation (step 512), with any variables such as <user> and <date> available as properties, and the process (500) ends. These extracted properties can be used as metadata on the workflow itself, for example, to set the participating users in the workflow, to set date fields, such as expiration dates or other deadlines, etc. Many further variations can be envisioned by those of ordinary skill in the art. It should, of course, also be noted that the notion of launching a workflow by means of an annotation and the notion of progressing a step in a workflow by means of an annotation are two completely independent processes, which may or may not be combined. That is, there might be situations in which adding an annotation at a certain step causes the workflow process to move forward to the next step, and where adding an annotation at a different step of the same workflow process causes a different workflow process to be launched. Many variations can be envisioned by those of ordinary skill in the art.

Concluding Comments

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for launching a process based on annotations made to a document in an enterprise content management system, the computer program product comprising:
　a non-transitory computer readable storage medium having computer readable program code embodied therewith, where the computer readable program code when executed on a computer causes the computer to:
　　detect, by programmatic examination of at least one of the document and information associated with the document, addition by a first document review person of a new document-review annotation during a first review of content of the document in the enterprise content management system, where the new document-review annotation as entered by the first document review person contains first information content added during the first review of the content of the document that indicates a result of completion of the first review of the content of the document by the first document review person within a current workflow process, and where the new document-review annotation is stored as a separate workflow route selection element within the enterprise content management system and the separate workflow route selection element is associated with the document within the enterprise content management system;
　　determine whether the new document-review annotation is of a particular type among sub-types indicating that a subsequent workflow process is to be performed;
　　in response to determining that the new document-review annotation is of the particular type among the sub-types indicating that the subsequent workflow process is to be performed, parse the new document-review annotation and extract information content from within the new document-review annotation that identifies the particular type to be used in routing the subsequent workflow process to one of a plurality of possible subsequent workflow processes;
　　route the document with the new document-review annotation to a selected subsequent workflow process selected, using the extracted information content of the new document-review annotation, from the plurality of possible subsequent workflow processes; and
　　launch the selected subsequent workflow process, where the launch uses at least some of the information content extracted from the new document-review annotation as parameters in the selected subsequent workflow process.

2. The computer program product of claim 1, where the computer readable program code when executed on the computer further causes the computer to:
　detect addition by a second document review person of a second document-review annotation during a second review of the content of the document as part of the selected subsequent workflow process, where the second document-review annotation as entered by the second document review person contains second information content added during the second review of the content of the document that indicates a result of completion of the second review of the content of the document by the second document review person within the selected subsequent workflow process, and where the second document-review annotation is stored as an additional separate workflow route selection element within the enterprise content management system and the additional separate workflow route selection element is associated with the document within the enterprise content management system;
　determine whether the second document-review annotation is of a particular type among sub-types indicating that the second subsequent workflow process is to be performed;
　in response to determining that the second document-review annotation is of the particular type among the sub-types indicating that the second subsequent workflow process is to be performed, parse the second document-review annotation and extract second information content from within the second document-review annotation that identifies the particular type to be used in routing the second subsequent workflow process to one of a second plurality of possible subsequent workflow processes;
　route the document with the second document-review annotation to a selected second subsequent workflow process selected, using the extracted second information content of the second document-review annotation, from the second plurality of possible subsequent workflow processes; and
　launch the selected second subsequent workflow process, where the launch uses at least some of the information content extracted from the second document-review annotation as parameters in the selected second subsequent workflow process.

3. The computer program product of claim 1, where the selected subsequent workflow process comprises a business process and the new document-review annotation represents an approval to proceed with the business process.

4. The computer program product of claim 1, where the detection of the addition of the new document-review annotation itself serves as a single trigger to launch the selected subsequent workflow process.

5. The computer program product of claim 1, where, in causing the computer to parse the new document-review annotation, the computer readable program code when executed on the computer causes the computer to extract the information content from customizable fields in the new document-review annotation, and the computer readable program code when executed on the computer further causes the computer to use at least a portion of the extracted information content as metadata in the selected subsequent workflow process.

6. An enterprise content management system configured to launch a process based on annotations made to a document in the enterprise content management system, comprising:
　a document repository storing documents and metadata associated with the documents in the enterprise content management system;
　a client application operable to display documents from the document repository to a user and to receive annotations onto the documents from the user; and
　a workflow engine hardware-based processor operable to:
　　detect, by programmatic examination of at least one of the document and information associated with the document, addition by a first document review person of a new document document-review annotation during a first review of content of the document in the enterprise content management system, where the new document-review annotation as entered by the first document review person contains first information content added during the first review of the content of the document that indicates a result of completion of the first review of the content of the document by the first document review person within a current workflow process, and where the new document-review annotation is stored as a separate workflow route selection element within the enterprise content management system and the separate workflow route selection element is associated with the document within the enterprise content management system;

determine whether the new document-review annotation is of a particular type among sub-types indicating that a subsequent workflow process is to be performed;

in response to determining that the new document-review annotation is of the particular type among the sub-types indicating that the subsequent workflow process is to be performed, parse the new document-review annotation and extract information content from within the new document-review annotation that identifies the particular type to be used in routing the subsequent workflow process to one of a plurality of possible subsequent workflow processes;

route the document with the new document-review annotation to a selected subsequent workflow process selected, using the extracted information content of the new document-review annotation, from the plurality of possible subsequent workflow processes; and launch the selected subsequent workflow process, where the launch uses at least some of the information content extracted from the new document-review annotation as parameters in the selected subsequent workflow process.

7. The enterprise content management system of claim 6, where:

the client application is further operable to detect addition by a second document review person of a second document-review annotation during a second review of the content of the document as part of the selected subsequent workflow process, where the second document-review annotation as entered by the second document review person contains second information content added during the second review of the content of the document that indicates a result of completion of the second review of the content of the document by the second document review person within the selected subsequent workflow process, and where the second document-review annotation is stored as an additional separate workflow route selection element within the enterprise content management system and the additional separate workflow route selection element is associated with the document within the enterprise content management system; and the workflow engine hardware-based processor is further operable to:

determine whether the second document-review annotation is of a particular type among sub-types indicating that the second subsequent workflow process is to be performed;

in response to determining that the second document-review annotation is of the particular type among the sub-types indicating that the second subsequent workflow process is to be performed, parse the second document-review annotation and extract second information content from within the second document-review annotation that identifies the particular type to be used in routing the second subsequent workflow process to one of a second plurality of possible subsequent workflow processes;

route the document with the second document-review annotation to a selected second subsequent workflow process selected, using the extracted second information content of the second document-review annotation, from the second plurality of possible subsequent workflow processes; and launch the selected second subsequent workflow process, where the launch uses at least some of the information content extracted from the second document-review annotation as parameters in the selected second subsequent workflow process.

8. The enterprise content management system of claim 6, where the selected subsequent workflow process comprises a business process and the new document-review annotation represents an approval to proceed with the business process.

9. The enterprise content management system of claim 6, where the detection of the addition of the new document-review annotation itself serves as a single trigger to launch the selected subsequent workflow process.

10. The enterprise content management system of claim 6, where parsing the new document-review annotation comprises extracting the information content from customizable fields in the new document-review annotation, and further comprising using at least a portion of the extracted information content as metadata in the selected subsequent workflow process.

* * * * *